United States Patent

Wrabel

[15] 3,703,648

[45] Nov. 21, 1972

[54] RESET CIRCUIT FOR LOGIC SYSTEM IN QUIESCENT STATE FOR A PREDETERMINED TIME UPON APPLICATION OF POWER AND UPON POWER FLUCTUATIONS BELOW A PREDETERMINED LEVEL

[72] Inventor: James A. Wrabel, Chicago, Ill.

[73] Assignee: The Seeburg Corporation of Delaware, Chicago, Ill.

[22] Filed: Sept. 11, 1970

[21] Appl. No.: 71,621

[52] U.S. Cl. ....................307/293, 307/202, 307/318
[51] Int. Cl. ....................H03k 5/13
[58] Field of Search....................307/202, 293, 318

[56] References Cited

UNITED STATES PATENTS

| | | | |
|---|---|---|---|
| 3,200,258 | 8/1965 | Carroll | 307/318 X |
| 3,400,277 | 9/1968 | Bruckner | 307/293 X |
| 3,225,695 | 12/1965 | Kapp et al. | 307/293 X |
| 2,947,916 | 8/1960 | Beck | 307/293 X |
| 3,144,568 | 8/1964 | Silliman et al. | 307/293 X |
| 3,253,210 | 5/1966 | Cummins | 307/318 X |
| 3,302,128 | 1/1967 | Schoemehl et al. | 307/293 X |
| 3,424,988 | 1/1969 | Baehr et al. | 307/293 X |

*Primary Examiner*—Stanley D. Miller, Jr.
*Assistant Examiner*—R. C. Woodbridge
*Attorney*—Ronald L. Engel, Daniel W. Vittum, Jr., Gomer W. Walters and John A. Waters

[57] ABSTRACT

A Zener diode is placed in series with the base of a transistor, which provides a reset signal when not conducting, to prevent conduction of the transistor until the breakdown voltage of the Zener is exceeded. An RC charging circuit is utilized to delay breakdown of the Zener diode for a specified time period after application of power to the system.

2 Claims, 1 Drawing Figure

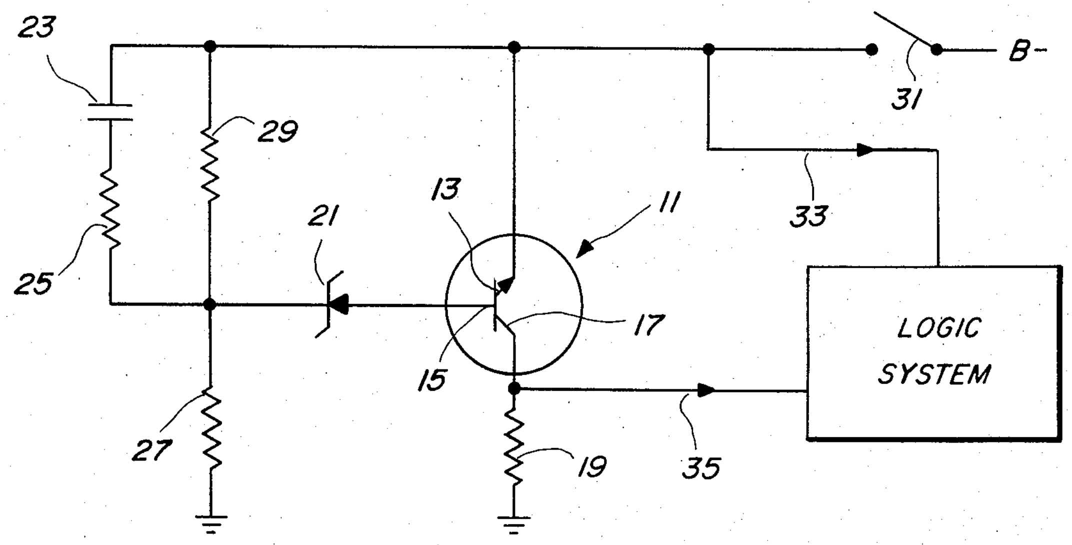
INVENTOR
JAMES A. WRABEL
BY Gomer W. Walters
ATTY

RESET CIRCUIT FOR LOGIC SYSTEM IN QUIESCENT STATE FOR A PREDETERMINED TIME UPON APPLICATION OF POWER AND UPON POWER FLUCTUATIONS BELOW A PREDETERMINED LEVEL

BACKGROUND OF THE INVENTION

1. Field of the Invention

This invention relates generally to a reset circuit for a logic system, and, more specifically, this invention relates to a reset circuit for resetting bistable devices in an electronic selecting arrangement for vending machines.

2. Description of the Prior Art

When utilizing logic circuits, turn-on of power to the logic circuits can result in erroneous operations. The same result may occur in the presence of power fluctuations that can cause undesired changes in the states of bistable devices as a result of erroneous logic signals.

With the advent of utilization of electronic logic circuits in vending machines, these problems are now facing manufacturers and users of vending machines. As a particular example of the utilization of electronic logic circuits in the vending field, reference may be made to the co-pending application of Thomas P. Jachimek and Thomas A. Murrell entitled SELECTING APPARATUS AND METHOD FOR PHONOGRAPH, U.S. Pat. application Ser. No. 862,624, filed on Sept. 11, 1969, now abandoned, and assigned to the same assignee as this invention, a continuation-in-part of which is being filed concurrently herewith. In this selecting arrangement for vending machines, such as coin-operated phonograph, the electronic logic circuits are utilized in integrated circuit form.

In such a use, an erroneous activation of a bistable device could result in vending of an undesired item, thus causing customer dissatisfaction leading to subsequent operator loss of profits. In addition, such an erroneous change in a bistable device could permit vending of an item without the proper credit being established, thus presenting another loss of profits situation for the operator.

SUMMARY OF THE INVENTION

To obviate these and other problems involved with power turn-on and power fluctuations in connection with the logic system, the present invention was developed. Briefly, this invention relates to a circuit for maintaining application of a reset signal to the logic system until a predetermined time after initial application of power. In this fashion, the bistable devices of the logic system will be retained in the reset or quiescent state until the possibility of errors introduced by initial application of power to the system has been greatly reduced. Another aspect of this reset circuit is that a reset signal will be applied to the logic system if the voltage of the power source falls below a specified level. This reset voltage will be applied to the logic system until the power source returns to its normal voltage level. Therefore, the major sources of logic element errors resulting from the power supply, i.e., changes of state during initial application of power and large power fluctuations during operation, are obviated.

The circuit utilized to perform these functions is based upon a switching element, such as a transistor, that removes the reset signal from the logic system upon turning on of power to the logic system. A controlling or breakdown device, such as a Zener diode, is utilized to maintain the switching element in the state existing prior to power turn-on until its breakdown voltage is reached. A charging circuit having a capacitor and a resistive network yields an RC time constant which determines the time lapse after initial power turn-on until the voltage applied to the breakdown device is sufficiently great to initiate breakdown.

Upon application of power to the system, the charging circuit will charge the capacitor until the voltage applied to the breakdown device initiates breakdown and subsequently causes a change of state of the switching element. The time constant of the charging circuit is such that the change of state of the switching element occurs sufficiently long after initial power turn-on to preclude most of the error causing results of power turn-on. If the voltage of the power supply should subsequently fall below the breakdown voltage of the breakdown device, the switching element would be returned to its initial state to again reset the bistable devices of the logic system until the voltage of the power source returns to its normal level.

Accordingly, a primary object of this invention is to provide a reset circuit for a logic system that retains bistable devices in the system in the initial or quiescent state for a predetermined period of time after application of power to the logic system.

Another object of this invention is to provide a reset circuit that will reset bistable devices in a logic system to the initial or quiescent state when the voltage of the power source falls below a specified level and that will retain the bistable devices in the initial or quiescent state until the voltage of the power source returns to its normal level.

A further object of this invention is to provide a single reset circuit that will both retain bistable devices in a logic system in the initial or quiescent state for a predetermined period after application of power to the logic system and also reset the bistable devices of the logic system to the initial or quiescent state if the voltage of the power source should fall below a specified level during operation of the system.

These and other objects, advantages, and features of the invention will hereinafter appear and, for purposes of illustration, but not of limitation an exemplary embodiment of the subject invention is shown in the appended drawing.

BRIEF DESCRIPTION OF THE DRAWING

The single FIGURE of this application is a schematic circuit diagram of a preferred embodiment of the present invention.

DETAILED DESCRIPTION OF THE PREFERRED EMBODIMENT

In the preferred embodiment of this invention illustrated in the single FIGURE of the application, a switching element, such as a transistor 11, is illustrated. While the switching element 11 used in this preferred embodiment is a transistor, it should be recognized that other types of switching arrangements could be utilized equally well.

Transistor 11 has an emitter 13, a base 15, and a collector 17. Emitter 13 of transistor 11 is connected to a power line having a negative supply voltage applied thereto. Collector 17 of transistor 11 is connected to ground through a load resistor 19. The size of load resistor 19 would be appropriately chosen to yield the desired results, but in this preferred embodiment a 10K Ohm resistor is utilized. Base 15 of transistor 11 is connected to a Zener diode 21. Zener diode 21 would be chosen to have a desired breakdown characteristic, in this preferred embodiment a Zener diode having a breakdown voltage of 20 volts has been chosen.

A charging circuit including a capacitor 23, a resistor 25, and a resistor 27 is illustrated. In this preferred embodiment, capacitor 23 has a capacitance of 100 microfarads, resistor 25 is a 2.7K Ohm resistor, and resistor 27 is a 10K Ohm resistor.

Resistor 27 is connected in series with a resistor 29 to provide a bias for the base 15 of transistor 11 through Zener diode 21. It should be noted that resistor 27 serves both to bias transistor 11 and to provide a charging path for capacitor 23, and thus its value has been carefully chosen to meet both requirements. Resistor 29, in this preferred embodiment, has a resistance of 750K Ohms.

A main power switch 31 connects a −27 volt power supply to the reset circuit, and, through line 33, to the logic system with which this circuit is utilized. A reset signal is obtained from collector 17 of transistor 11 and applied to the appropriate reset terminals of the bistable devices in the logic system.

When switch 31 is open and no power is applied to the reset circuit, the collector 17 of transistor 11 has a ground potential and this potential on line 35 serves to reset all of the appropriate bistable devices in the logic system. Upon initial closure of switch 31, capacitor 23 begins charging through resistors 25 and 27. The charging rate of capacitor 23 is determined by the capacitance of capacitor 23 and the magnitudes of resistors 25 and 27. Upon initial charging of capacitor 23, the voltage drop across resistor 27 is approximately 20 volts, so that the voltage drop across resistor 29 is only about 7 volts. As capacitor 23 continues to charge, the charging current decreases and the voltage drop across resistor 27 also decreases. When the voltage drop across resistor 27 has decreased to the point that the voltage drop across 29 is approximately 20.7 volts, the 20.7 volts applied across the emitter-base junction of transistor 11 and Zener diode 21 causes breakdown of Zener diode 21. Upon breakdown of Zener diode 21, transistor 11 is caused to conduct, which removes the reset signal from line 35. Therefore, after the predetermined time period determined by the charging rate of capacitor 23, the reset signal will be removed from the bistable devices in the logic system. This time delay before removal of the reset signal is calculated to be long enough to minimize the chances of an erroneous change of state in the logic system as a result of transient conditions accompanying power turn-on.

If the voltage of the power signal passing through switch 31 drops below 20 volts, the breakdown of Zener diode 21 cannot be maintained and it will shut off, thus causing transistor 11 to return to its initial non-conducting state. At this point, the reset signal would again appear on line 35 to reset the bistable devices in the logic system. This signal will remain on line 35 to place the bistable devices in the quiescent state until the voltage of the power supply returns to its normal value. Therefore, this reset circuit retains the reset signal until after transient conditions caused by turn-on of the power supply have subsided, and the reset circuit further supplies a reset signal if the power supply voltage falls below a specified level.

It should be understood that various modifications, changes, and variations may be made in the arrangements, operations, and details of construction of the elements disclosed herein without departing from the spirit of the scope of the present invention.

I claim:

1. A reset circuit for a vending machine selecting system comprising:

a power source adapted to provide power to the reset circuit and the selecting system;

a transistor connected across said power source;

a first resistor and a second resistor connected in series to provide a bias for the base of said transistor;

a Zener diode connected from the base of said transistor to the midpoint of said first and second resistors, said Zener diode conducting current in the reverse direction when its breakdown voltage is exceeded and ceasing to conduct when the voltage from said power source decreases to the point that the voltage at the midpoint of said first and second resistors is less than the breakdown voltage of said Zener diode; and a capacitor and a third resistor connected in series across said first resistor to determine the time duration after initial application of power from said power source to the system until the voltage at the midpoint of said first and second resistors reaches the breakdown voltage of said Zener diode, whereby a reset signal is obtained from the collector of said transistor for a predetermined time duration after the initial application of power to the selecting system and whenever the voltage of said power source falls below a specified level.

2. A reset circuit as claimed in claim 1 wherein:

the emitter of said transistor is connected to said power source;

the collector of said transistor is connected to ground through a load resistor; and said first resistor is connected from said power source to the base of said transistor, and said second resistor is connected from the base of said transistor to ground; and said capacitor has one side thereof connected to said power source.

* * * * *